Jan. 28, 1941.   H. KRAUSE   2,229,746
BASIN DIGGER
Filed July 26, 1939   2 Sheets-Sheet 1
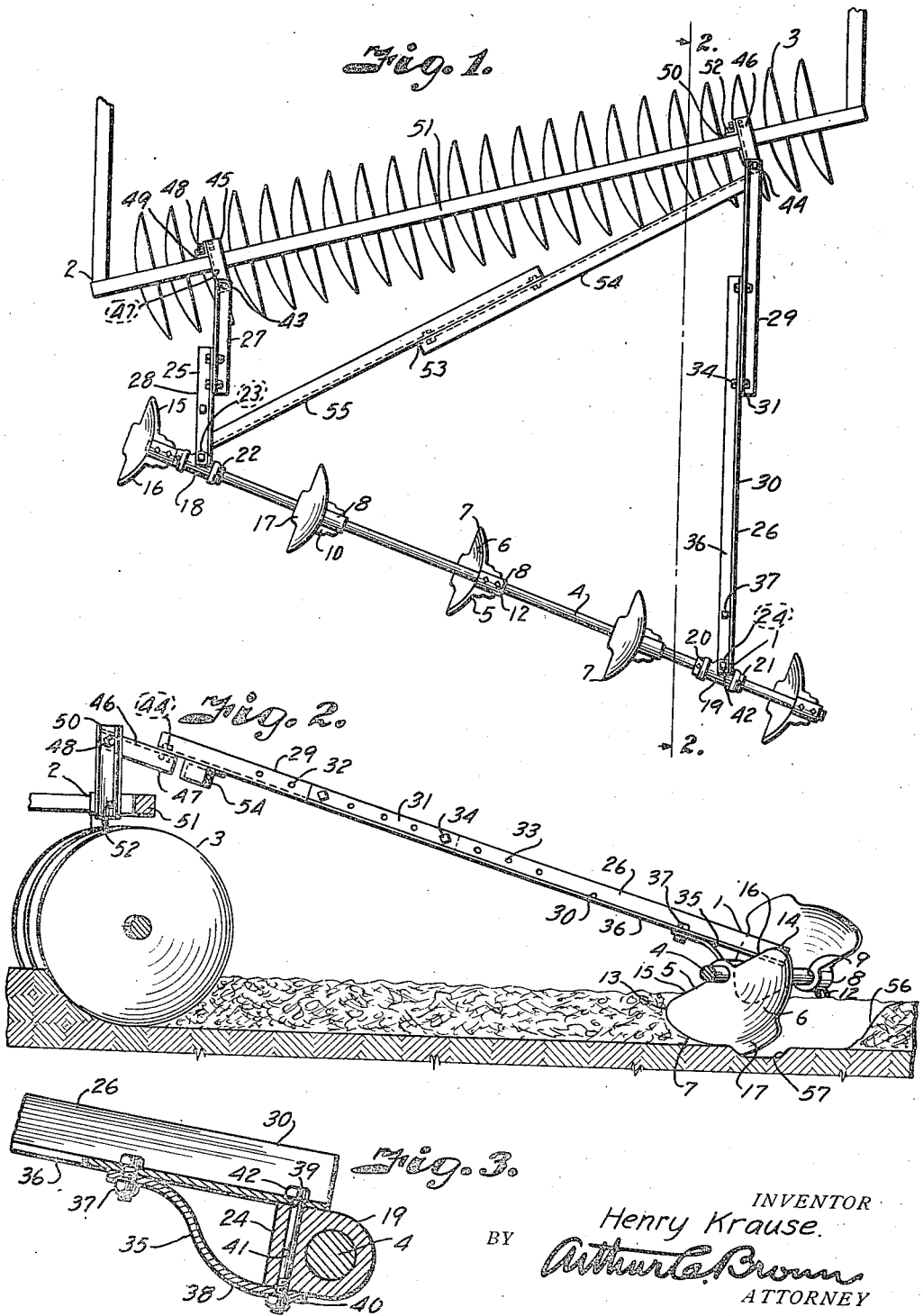
INVENTOR
Henry Krause.
BY
ATTORNEY Jan. 28, 1941. H. KRAUSE 2,229,746
BASIN DIGGER
Filed July 26, 1939 2 Sheets-Sheet 2
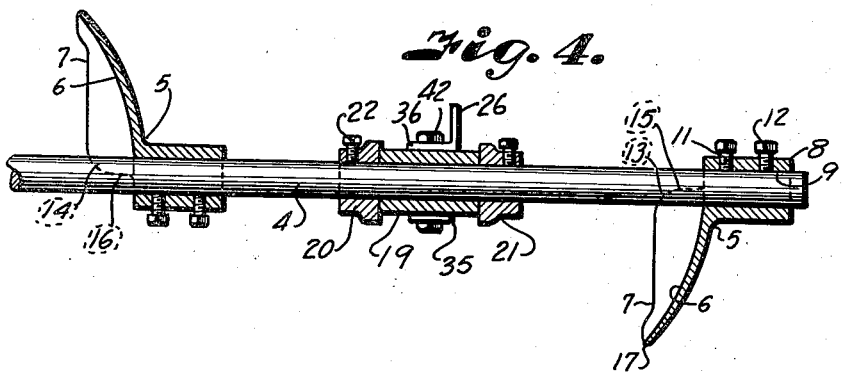
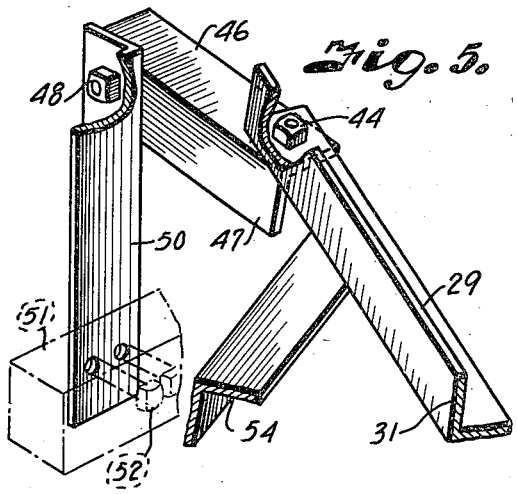
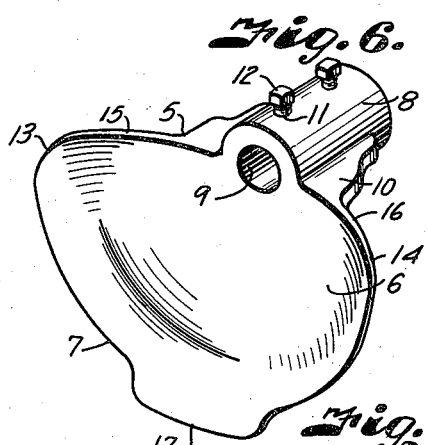
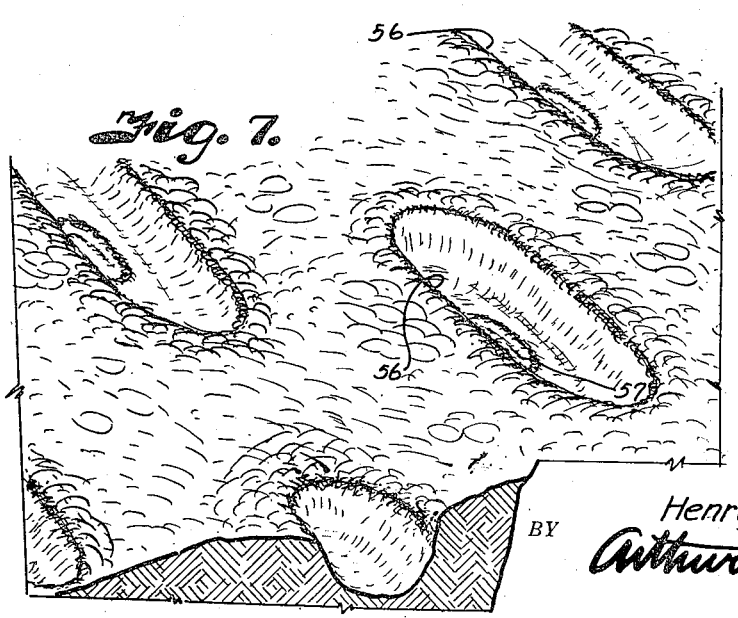
INVENTOR
Henry Krause
BY Arthur E. Brown
ATTORNEY Patented Jan. 28, 1941

2,229,746

UNITED STATES PATENT OFFICE 2,229,746

BASIN DIGGER

Henry Krause, Hutchinson, Kans.

Application July 26, 1939, Serial No. 286,625

5 Claims. (Cl. 55—30)

This invention relates to machines commonly known as basin diggers for forming a grid-like arrangement of rain retention basins over the surface of a field so that rain is retained where it falls and is prevented from running off.

It has been found that in agricultural regions where the annual rainfall is light, or the major rains occur at certain seasons of the year, such treatment has been beneficial to crop production, but since the basins are formed in the relatively loose top soil, heavy rains tend to wash out the walls of the basins and produce erosion. It has been found that the basins are beneficial to prevent blowing of the soil but in severe winds the loose top soil is subject to wind erosion.

It is therefore, the principal object of the present invention to provide a basin digger construction to form the basins in such a manner that they are of more stable character and better able to withstand heavy rainfall and wind erosion, and to retard surface evaporation of the moisture when it soaks into the soil.

Other objects of the invention are to provide a basin digger wherein the basin forming elements are readily adjusted to vary spacing and width of the basins; to provide a basin digger adapted for free floating attachment to a tilling implement; to provide a hitch connection adapted for variably adjusting the draft angle of the basin forming elements with respect to the tilling machine; to provide a basin digger with basin forming elements designed so that they may be formed of a single casting having chill hardened wearing surfaces, thereby reducing cost of construction; and to provide basin forming elements adapted to form supplementary basins in the subsoil.

In accomplishing these and other objects of the invention, as hereinafter pointed out, I have provided improved details of structure, the preferred forms of which are illustrated in the accompanying drawings, wherein:

Fig. 1 is a plan view of a basin digger embodying the features of the present invention and showing its attachment to a disk plow or harrow.

Fig. 2 is a longitudinal section on the line 2—2 of Fig. 1, showing the formation of a water retaining basin.

Fig. 3 is a detail section through one of the shaft bearings and its draft connection.

Fig. 4 is a longitudinal section through a portion of the basin digger showing the basin forming elements and the method of adjustably securing the basin forming elements on the mounting shaft.

Fig. 5 is a detail perspective view of the draft connection with the tilling implement.

Fig. 6 is a detail perspective view of one of the preferred forms of basin digging elements.

Fig. 7 is a detail perspective view showing the grid-like basin arrangement formed in accordance with the present invention.

Figs. 8 and 9 are detail views of modified forms of basin digging elements.

Referring more in detail to the drawings:

1 designates a basin digger constructed in accordance with the present invention and adapted for attachment to a tilling machine 2, such as a disk plow or harrow 3 as illustrated in Fig. 1, and which includes a shaft 4 of a length conforming with the width of the tilling machine and of sufficient diameter to be self-supporting under the thrusts imparted by the basin forming elements 5 that are fixed thereon at spaced intervals. The elements 5 preferably consist of concavo-convex segments 6, which are sufficiently thin to form shovel-like blades having arcuate cutting edges 7.

Preferably formed integrally with the disks, on the convex sides thereof, are hubs 8 which may be located in the axial centers of the segments and have bores 9 of suitable diameter to be freely slidable on the shaft 4. The disks are reinforced with respect to their hubs by webs 10, as shown in Fig. 6. The hubs 8 are drilled and tapped as at 11 to receive set screws 12 by which the disks are adjustably fixed on the shaft.

In the disk illustrated in Fig. 6, the blade-like body is of substantially semicircular form, and the terminals of the cutting edges terminate in rounded portions 13 and 14 merging in radial edges 15 and 16 connected with the hub 8. The blade portion of the disk is provided with an extension 17 at a point midway thereof and of sufficient length to form a pocket in the undisturbed subsoil at the bottom of the basin, and which serves to throw out and spread the harder subsoil upon the usually exposed upper surfaces of the loose top soil, for the purpose later described.

The basin forming elements just described are adapted to be cast as a single unit, and the peripheral cutting edges may be chill hardened incidental to the casting process.

The shaft carrying the basin forming elements is journalled in bearings 18 and 19 and is retained against longitudinal movement by collars 20 and 21 fixed to the shaft 4 by set screws 22 and engaging the respective ends of the bearings as shown in Fig. 1. The bearings have forwardly extending ears 23 and 24 to which are pivotally connected draft arms 25 and 26. The draft arms preferably consist of sections 27—28 and 29—30. The sections are formed of angle-irons and arranged with a pair of flanges in back to back relation, the flanges 31 being provided with a series of openings 32 and 33 for receiving fastening devices 34 whereby the length of the draft arms are adjustable to vary the angle and spacing of the shaft with respect to the draft implement.

The rear ends of the draft arms have straps 35 fixed to the other flanges 36 by fastening devices 37. The terminal ends of the straps curve downwardly and rearwardly and cooperate with the rear ends of the flanges 36 in forming yoke-like brackets 38 for engaging the ears of the bearings, the flanges 36 and terminal ends of the straps being provided with openings 39 and 40 which register with similar openings 41 in the ears of the bearings to pass bolts 42 to form pivotal connections. The forward ends of the draft arms are preferably connected by fastening devices 43 and 44 with extensions 45 and 46 which have one of their flanges lappingly engaging the horizontal flanges 36 of the forward sections, as clearly shown in Fig. 3.

The vertical flanges 47 of the extensions are in turn pivoted by fastening devices 48 with vertical brackets 49 and 50 that are attached to the frame 51 of the draft implement 3 by fastening devices 52. It is thus obvious that the basin digger is adapted to pivot on horizontal axes with respect to the tilling machine whereby basin forming elements are adapted to roll upon and follow the contour of the ground. By adjusting lengths of the draft arms, the angle of the shaft 4 may be varied with respect to the forward travel of the tilling machine to vary the angle of attack of the disks, thereby varying the width of the basins.

The forward end of the longer draft arm is preferably connected to the rear end by a diagonal brace 53 composed of sections 54 and 55 having adjustment similar to the sections of the draft arms, whereby the diagonal brace may be adjusted for length when the draft arms are adjusted.

The disk element shown in Fig. 8 is similar to those just described, except that the blade portion of the disk and hub are formed of separate parts, the hub being welded to the disk. In the form shown in Fig. 9, the hub is mounted eccentrically of the disk and at an angle with respect to the disk axis.

It is obvious that the extent of the cutting edges of all the disks governs the length of the basins and that the cutting edges may be longer or shorter without departing from the spirit of the invention.

In using the machine, it is attached in trailing relation with a tilling implement with the draft arms adjusted to give the angle of attack of the disks so as to produce basins of desired width. The spacing between the basins may be varied by adjusting the disks on the shaft. The grid-like arrangement of the basins, or the staggered relative relation thereof, may also be varied by adjusting the disks readily about the shaft. For example, if the blade portion of every other element is positioned at one side of the shaft, and the disk portions of the intermediate elements are positioned at the opposite side of the shaft, the basins in every other row will register and the intermediate basins will be staggered therewith as shown in Fig. 7.

When the machine is drawn over the field, the blade portions of the disk roll in contact with the soil and cut through the top soil to remove portions thereof to form the basins 56, which removed portions are deposited between the basins to form ridges to increase the depth thereof. The extension portions 17 of the cutting edges penetrate the subsoil and form subbasins or pockets 57 to increase the water retention capacities and to remove sufficient of the hard soil which is turned and scattered over the loose top soil, thereby preventing erosion caused by heavy torrents and wind which are ordinarily destructive to the basins formed in the loose top soil. The heavier soil covering the loose soil also retards surface evaporation of the moisture in the loose soil and the moisture is retained for longer periods, thereby further preventing wind erosion usually caused by rapid drying out of the soil through surface evaporation.

From the foregoing it is obvious that I have provided a basin digger so designed as to form basins which are better able to withstand wind and rain erosion and which have larger capacities by reason of the subsoil pockets.

The basin forming elements are of simple design and well adapted to be cast in single units with the wearing edge chill hardened in the manner well known in foundry practice.

What I claim and desire to secure by Letters Patent is:

1. In a device of the character described, a basin forming member including a concavo-convex disk segment having a cutting edge to form a basin, and means on said cutting edge to form a pocket in the bottom of said basin.

2. In a device of the character described, a basin forming member including a concavo-convex disk segment having a cutting edge to form a basin, means on said cutting edge to form a pocket in the bottom of said basin, and means mounting said disk segment for rotation about an axis to effect deposit of material removed from said pocket over material removed to form said basin.

3. In a device of the character described, a basin forming member including a concavo-convex disk segment having a cutting edge to form a basin, means on said cutting edge to form a pocket in the bottom of said basin, and means mounting said disk segment for rotation about an axis offset with respect to the disk segment axis to effect deposit of material removed from said pocket over material removed to form said basin.

4. In a basin forming machine, a shaft, means connecting the shaft with a draft implement, a series of basin forming elements on said shaft, and means associated with said basin forming elements for forming pockets in the bottoms of said basins.

5. In a basin forming machine, a shaft, means connecting the shaft with a draft implement, a series of basin forming elements on said shaft, and means associated with said basin forming elements for forming pockets in the bottoms of said basins, said connecting means being adjustable in length to selectively position the shaft with respect to the draft implement for varying the width of said basins and said pockets in the bottoms of said basins.

HENRY KRAUSE.